(12) United States Patent
Kang

(10) Patent No.: US 9,618,679 B2
(45) Date of Patent: Apr. 11, 2017

(54) REFLECTIVE FILM, BACKLIGHT MODULE AND DISPLAY APPARATUS

(71) Applicants: HEFEI BOE DISPLAY LIGHT CO., LTD., Hefei (CN); BOE TECHNOLOGY GROUP CO., LTD., Beijing (CN)

(72) Inventor: Yaling Kang, Beijing (CN)

(73) Assignees: Hefei BOE Display Co., Ltd., Hefei (CN); BOE Technology Group Co., Ltd., Beijing (CN)

( * ) Notice: Subject to any disclaimer, the term of this patent is extended or adjusted under 35 U.S.C. 154(b) by 519 days.

(21) Appl. No.: 14/235,995

(22) PCT Filed: Nov. 8, 2013

(86) PCT No.: PCT/CN2013/086751
§ 371 (c)(1),
(2) Date: Jan. 29, 2014

(87) PCT Pub. No.: WO2014/180103
PCT Pub. Date: Nov. 13, 2014

(65) Prior Publication Data
US 2016/0245977 A1    Aug. 25, 2016

(30) Foreign Application Priority Data

May 9, 2013    (CN) .......................... 2013 1 0170071

(51) Int. Cl.
*F21V 8/00* (2006.01)
(52) U.S. Cl.
CPC ......... *G02B 6/0031* (2013.01); *G02B 6/0068* (2013.01); *G02B 6/0073* (2013.01)

(58) Field of Classification Search
CPC ............................ G02B 6/0031; G02B 6/0068
See application file for complete search history.

(56) References Cited

U.S. PATENT DOCUMENTS

2005/0253980 A1* 11/2005 Saito .................... G02B 6/0038
349/64

FOREIGN PATENT DOCUMENTS

| CN | 201599726 U | 10/2010 |
|---|---|---|
| CN | 202720419 U | 2/2013 |
| CN | 103047609 A | 4/2013 |

OTHER PUBLICATIONS

Nov. 10, 2015—International Preliminary Report on Patentability Appn PCTCN2013086751.

(Continued)

*Primary Examiner* — Mary Ellen Bowman
(74) *Attorney, Agent, or Firm* — Banner & Witcoff, Ltd.

(57) ABSTRACT

Embodiments of the present invention disclose a reflective film, a backlight module comprising the reflective film and a display apparatus comprising the backlight module. A row of low-reflection dots are disposed on a side of a surface of the reflective film, and regions of the surface of the reflective film corresponding to the low-reflection dots have smaller reflectivity with respect to the incident light from an LED light strip disposed at a side of the row of the low-reflection dots than other regions of the surface of the reflective film with respect to the incident light from the LED light strip. The regions of the reflective film directly facing the LED are changed into low-reflection regions, in which the reflectivity is reduced. Therefore the alternate bright and dark phenomenon at light incident side is reduced or eliminated and display quality of the display apparatus is further improved.

12 Claims, 3 Drawing Sheets

(56) References Cited

OTHER PUBLICATIONS

International Search Report for International Application No. PCT/CN2013/086751, 12pgs.
First Office Action issued by the Chinese Patent Office for Chinese Patent Application No. 2013101700711 dated Nov. 29, 2013, 4pgs.
English translation of First Office Action issued by the Chinese Patent Office for Chinese Patent Application No. 2013101700711 dated Nov. 29, 2013, 3pgs.
Second Office Action issued by the Chinese Patent Office for Chinese Patent Application No. 2013101700711 dated Jun. 10, 2014, 5pgs.
English translation of Second Office Action issued by the Chinese Patent Office for Chinese Patent Application No. 2013101700711 dated Jun. 10, 2014, 3pgs.
Rejection Decision issued by the Chinese Patent Office for Chinese Patent Application No. 201310170071.1 dated Sep. 2, 2014, 5pgs.
English translation of Rejection Decision issued by the Chinese Patent Office for Chinese Patent Application No. 201310170071.1 dated Sep. 2, 2014, 5pgs.

\* cited by examiner

REFLECTIVE FILM, BACKLIGHT MODULE AND DISPLAY APPARATUS

CROSS REFERENCE TO RELATED APPLICATIONS

This application is based on International Application No. PCT/CN2013/086751 filed on Nov. 8, 2013, which claims priority to Chinese National Application No. 201310170071.1 filed on May 9, 2013, the contents of which are incorporated herein by reference.

TECHNICAL FIELD

Embodiments of the present invention relate to display technology, and more particularly, to a reflective film, backlight module and display apparatus.

BACKGROUND

Currently, reflective film is used in backlight module of display apparatus in order to improve light efficiency by means of high reflectivity of the reflective film. The conventional reflective film mainly includes three layers, that is, a reflective layer 101, Polyethylene Terephthalate (PET) layer 102 and a backside coating 103 which are stacked on one another from top to bottom, as shown in FIG. 1. When used in a backlight module, the reflective film is attached on the reflection surface of the light guiding plate of the backlight module. However, in a backlight module operated with a side incident mode, there are intervals between adjacent light emitting diodes (LEDs) in a light strip. According to optical theory, at light incident side, the reflective lights would be strongest at portions of reflection surface directly in front of each LED, and become weaker at portions of reflection surface corresponding to regions between two adjacent LEDs. Therefore, alternate bright and dark regions would appear on the reflection surface at light incident side, causing a common hot spot phenomenon in the field, which could reduce display quality of the display apparatus.

SUMMARY

Embodiments of the present invention provide a reflective film. A row of a first low-reflection dots are disposed along a side of a surface of the reflective film, and regions of the surface of the reflective film corresponding to the first low-reflection dots have smaller reflectivity with respect to incident lights from a LED light strip disposed along the row of the first low-reflection dots than other regions of the surface of the reflective film with respect to the incident light from the LED light strip.

The row of the low-reflection dots are disposed in parallel to the LED light strip.

The first low-reflection dots have a same number as LEDs in the LED light strip, and each of the first low-reflection dots is disposed directly in front of corresponding LED.

The first low-reflection dots are formed as grooves, protrusions or coating of low-reflectivity material on the surface of the reflective film, and the low-reflectivity material has a smaller reflectivity with respect to the incident light from the LED light strip than other regions of the surface of the reflective film with respect to the incident light from the LED light strip.

The first low-reflection dots may have a circular shape, a triangular shape or a polygonal shape.

Embodiments of the present invention also provide a backlight module. The backlight module comprises a light guiding plate, an LED light strip disposed at light incident side of the light guiding plate, and a reflective film disposed on a bottom reflection surface of the light guiding plate, wherein the reflective film is the above mentioned reflective film.

Embodiments of the present invention further provide a display apparatus comprising the above mentioned backlight module.

DETAILED DESCRIPTION

In order to make objects, technical solutions and advantages of the embodiments of the invention apparent, the technical solutions of the embodiment will be described clearly and fully in connection with the drawings related to the embodiments of the invention. It is obvious that the described embodiments are just a part but not all of the embodiments of the invention. Based on the described embodiments herein, those skilled in the art can obtain other embodiment(s), without any creative work, which should be within the scope of the invention. Hereinafter, various exemplary embodiments are described in detail with reference to the accompanying drawings. Obviously, the following embodiments are used to explain the present invention, and are not intend to limit the present invention.

Figure 1:
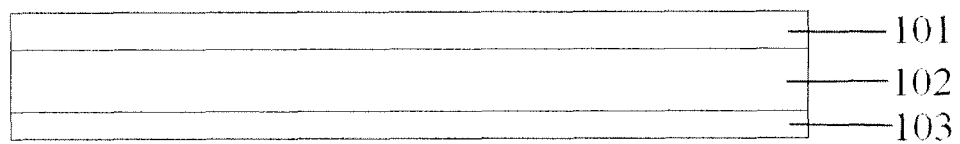
FIG. 1 is a structural schematic view of a reflective film in prior art.

The present embodiment provides a reflective film, which is mainly used in the backlight module of the display apparatus and disposed according to the position of the light source of the backlight module. As shown in FIG. 1, a reflective film 1 comprises a row of low-reflection dots 2 disposed along a side of a surface of a typical reflective film. Regions of the surface of the reflective film 1 corresponding to the low-reflection dots 2 have smaller reflectivity with respect to the incident light from the LED light strip 3 disposed along the row of low-reflection dots 2 than other regions of the surface of the reflective film 1 with respect to the incident light from the LED light strip 3. The LED light strip 3 irradiates light onto the reflective film 1 disposed in front of it. By providing low-reflection dots 2 at regions directly facing the LED light strip 3 on light incident side, reflectivity of lights on these regions can be reduced. Therefore, it is possible to prevent the brightness at these regions from being greater than the brightness at other regions, so as to reduce or eliminate the alternate bright and dark phenomenon at light incident side of the LED light strip.

In particularly, the row of low-reflection dots 2 is disposed in parallel to the LED light strip 3, thus the low-reflection dots 2 can uniformly reduce the reflectivity of the incident light at light incident side. Number of the low-reflection dots 2 can be equal to number of LEDs in the LED light strip 3, and each low-reflection dots 2 is disposed directly in front of corresponding LED. At light incident side, for the lights emitted from each LED, the lights directly in front of the LED have the greatest brightness. Therefore, by providing low-reflection dots 2 directly in front of the LED, reflectivity of light at light incident side can be reduced, and the alternate bright and dark phenomenon can be prevented. If number of the low-reflection dots 2 is smaller than number of LEDs in the LED light strip 3, and each low-reflection dots 2 is disposed directly in front of corresponding LED, then the alternate bright and dark phenomenon at light incident side can be partially reduced or eliminated.

Figure 2:
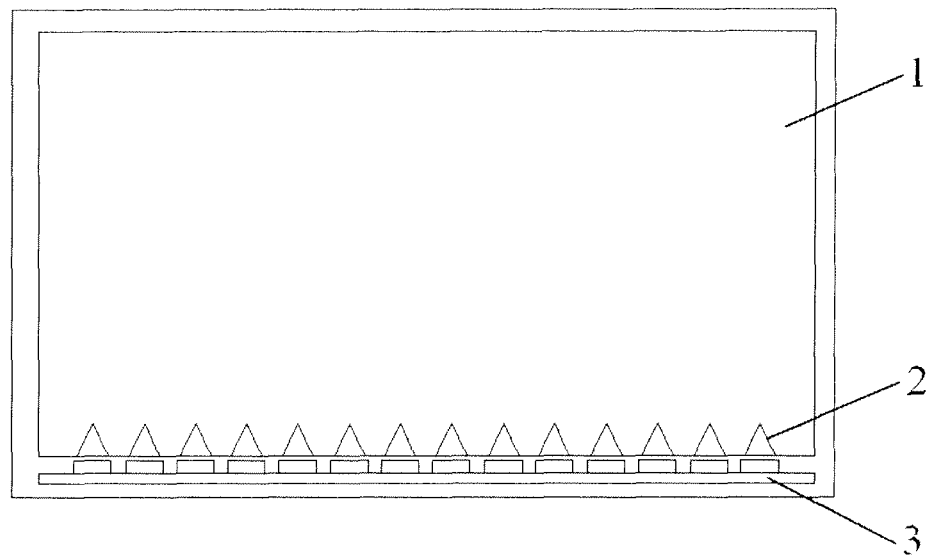
FIG. 2 is a schematic view illustrating relative position of a reflective film and a backlight source according to an embodiment of the present invention in which low-reflection dots are formed to have a triangular shape.
Figure 3:
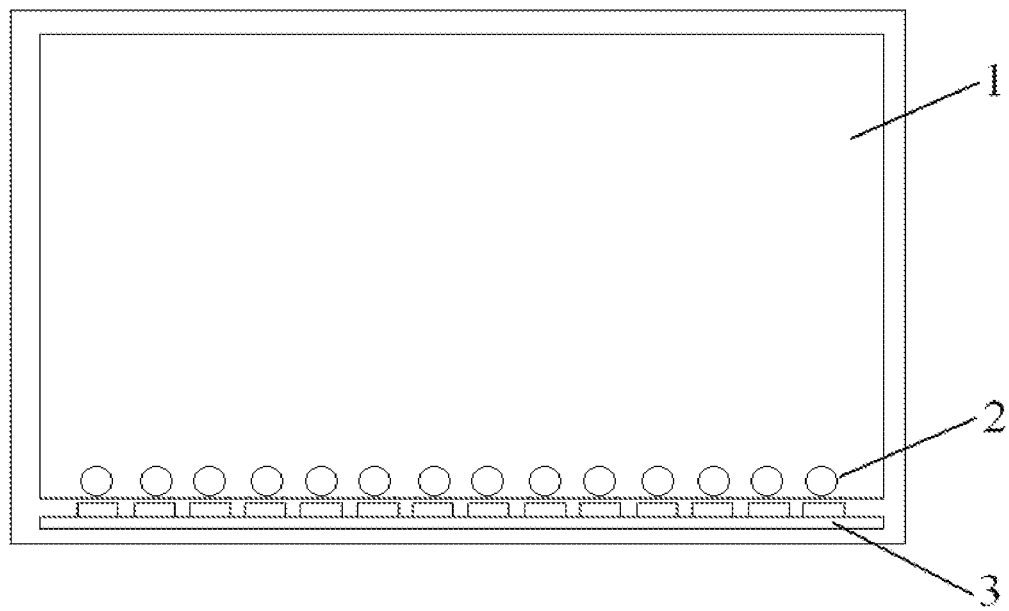
FIG. 3 is a schematic view illustrating relative position of a reflective film and a backlight source according to an embodiment of the present invention in which low-reflection dots are formed to have a circular shape.
Figure 4:
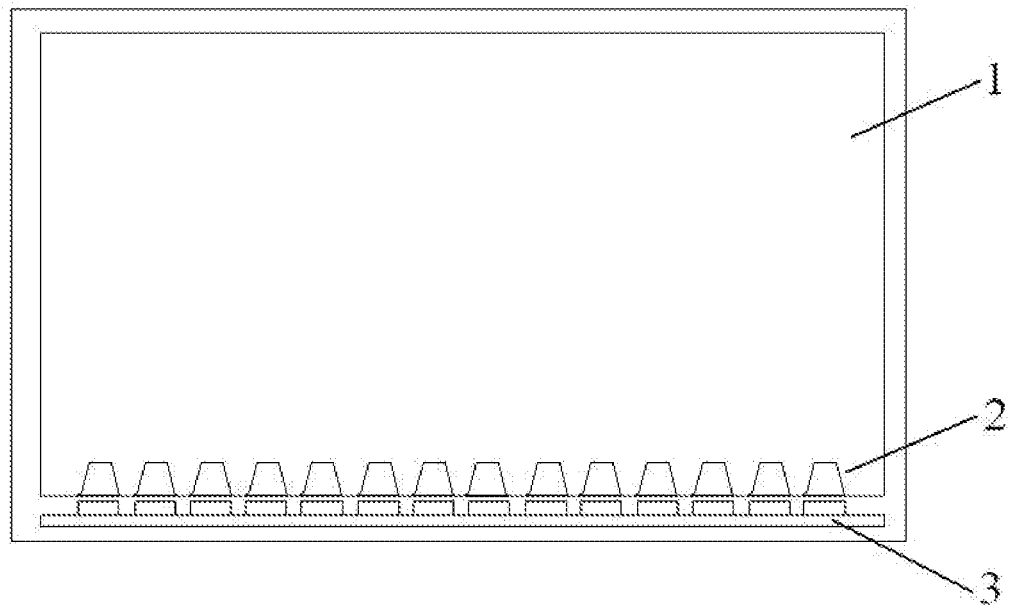
FIG. 4 is a schematic view illustrating relative position of a reflective film and a backlight source according to an embodiment of the present invention in which low-reflection dots are formed to have a polygonal shape.

The low-reflection dots 2 can be formed as grooves or protrusions on the surface of the reflective film 1, as illustrated in FIGS. 2-4. By providing such grooves or protrusions, diffusion occurs on the surface of the reflective film 1 at light incident side, and mirror reflection is prevented, so that reflectivity of light on regions corresponding to the low-reflection dots is reduced. The grooves or protrusions can be formed by punching corresponding regions on the surface of the reflective film 1 using dies.

Figure 5:
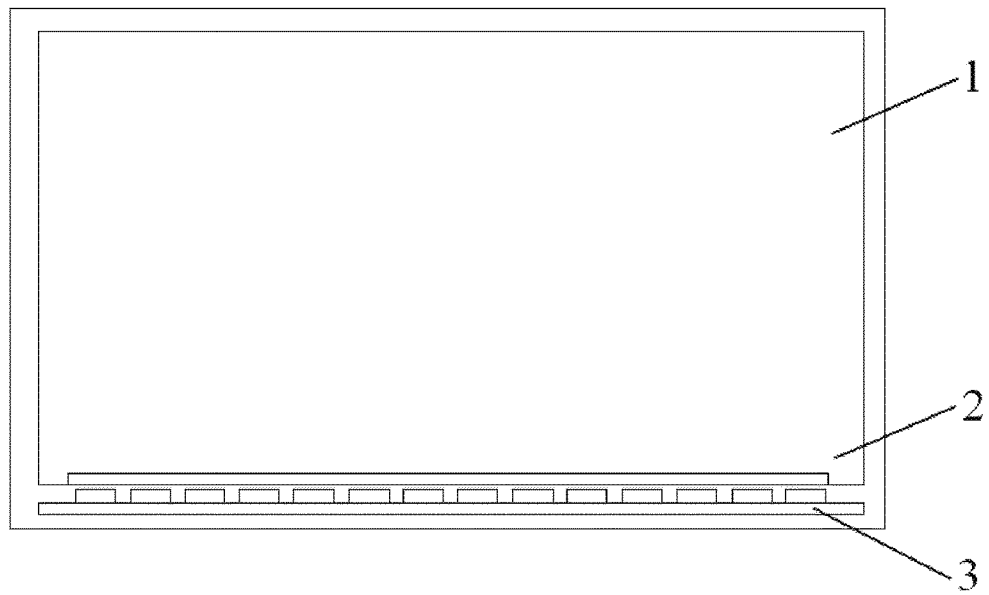
FIG. 5 is a schematic view illustrating relative position of a reflective film and a backlight source according to an embodiment of the present invention in which low-reflection dots are formed as a low-reflectivity material coating.

The low-reflection dots 2 can also be a low-reflectivity material coating, as illustrated in FIG. 5. When providing the low-reflectivity material coating, by selecting low-reflectivity material having smaller reflectivity with respect to the incident light from the LED light strip 3 than other regions of the surface of the reflective film 1 with respect to the incident light from the LED light strip 3, reflectivity of light on regions corresponding to the low-reflection dots 2 is reduced. The low-reflectivity material coating can be formed by printing. The low-reflectivity material coating can comprise a material with low content of barium sulfate.

The low-reflection dots 2 can also be formed in other manner, as long as the low-reflection dots 2 have smaller reflectivity with respect to the incident light from the LED light strip 3 disposed along the row of low-reflection dots 2 than other regions of the surface of the reflective film 1 with respect to the incident light from the LED light strip 3.

As illustrated in FIGS. 2-4, the low-reflection dots 2 may have a circular shape, a triangular shape or a polygonal shape. These shapes are commonly used optical dots for changing traveling direction of light and reflectivity of light.

Figure 6:
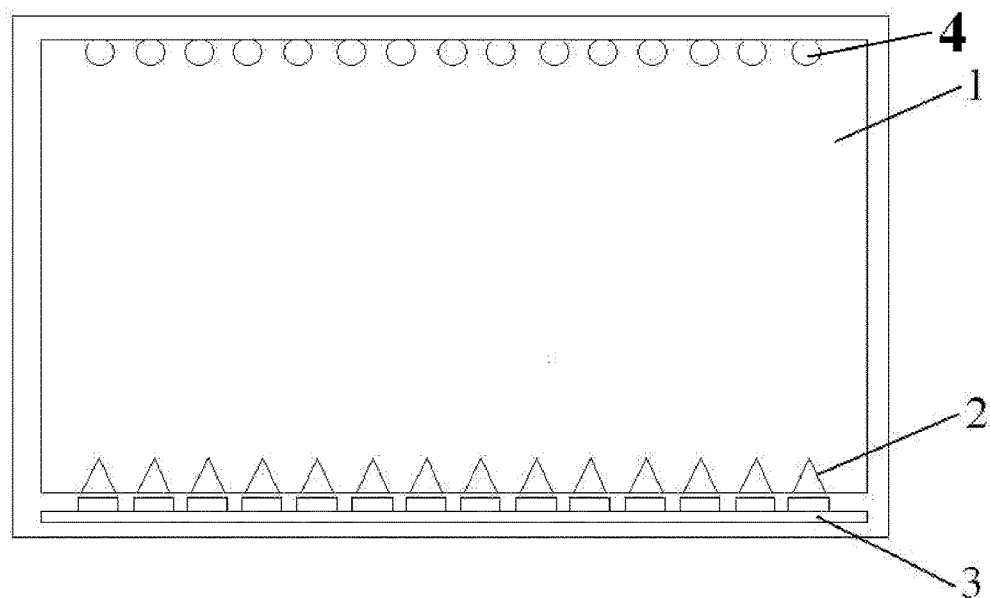
FIG. 6 is a schematic view illustrating relative position of a reflective film and a backlight source according to an embodiment of the present invention in which a second row of low-reflection dots are disposed.

If necessary, at least one row of second low-reflection dots 4 in parallel to the row of low-reflection dots 2 can be further disposed on the opposite side of the row of low-reflection dots 2 with respect to the LED light strip 3, as illustrated in FIG. 6. The second low-reflection dots 4 have smaller reflectivity with respect to the incident light from the LED light strip 3 than other regions of the surface of the reflective film with respect to the incident light from the LED light strip 3. The second low-reflection dots 4 may have different shapes compared with the low-reflection dots 2.

Based on the above mentioned reflective film, an embodiment of the present invention further provides a backlight module. The backlight module comprises a light guiding plate, a LED light strip disposed at light incident side of the light guiding plate, and a reflective film disposed on a bottom reflection surface of the light guiding plate. The arrangement and relative position of the reflective film and the LED light strip are shown in FIG. 1, and the detailed description is omitted herein by referring to the above mentioned description for the reflective film.

Based on the above mentioned backlight module, an embodiment of the present invention further provides a display apparatus comprising the backlight module. The display apparatus may be any product or components having display function, such as liquid crystal TV, notebook computer, tablet PC, cell phone, digital photo frame, electronic paper, etc.

It can be seen from the above mentioned embodiments that by providing low-reflection dots on the surface of the reflective film and reducing the reflectivity of regions corresponding to the low-reflection dots to be smaller than those of other regions of the surface of the reflective film, the regions of the reflective film directly facing the LED are changed into low-reflection regions, in which the reflectivity at light incident side is reduced. Therefore the alternate bright and dark phenomenon at light incident side is reduced or eliminated and display quality of the display apparatus is further improved.

The foregoing is merely the exemplary embodiments of the present invention. It will note for those skilled in the art that some modifications and substitutions without departing technical principle of the present invention are within the protection scope of the present invention.

What is claimed is:

1. A reflective film, comprising:
   a row of first low-reflection dots disposed along a side of a surface of the reflective film,
   wherein regions of the surface of the reflective film corresponding to the row of the first low-reflection dots have smaller reflectivity with respect to incident lights from a LED light strip disposed along the row of the first low-reflection dots than other regions of the surface of the reflective film with respect to the incident light from the LED light strip,
   wherein the first low-reflection dots are formed as protrusions or as a coating of low-reflectivity material on the surface of the reflective film, and the low-reflectivity material has a smaller reflectivity with respect to the incident light from the LED light strip than other regions of the surface of the reflective film with respect to the incident light from the LED light strip, and
   wherein the first low-reflection dots formed as protrusions have a same number as LEDs in the LED light strip, and each of the first low-reflection dots is disposed directly in front of a corresponding LED.

2. The reflective film according to claim 1, wherein the row of the first low-reflection dots is disposed in parallel to the LED light strip.

3. The reflective film according to claim 1, wherein the first low-reflection dots have a circular shape, a triangular shape or polygonal shape.

4. The reflective film according to claim 1, wherein at least one row of second low-reflection dots in parallel to the row of the first low-reflection dots is disposed on the opposite side of the row of the first low-reflection dots with respect to the LED light strip, the second low-reflection dots have smaller reflectivity with respect to the incident light from the LED light strip than other regions of the surface of the reflective film with respect to the incident light from the LED light strip.

5. The reflective film according to claim 4, wherein the second low-reflection dots may have different shapes compared with the first low-reflection dots.

6. A backlight module, comprising a light guiding plate, an LED light strip disposed at a light incident side of the light guiding plate, and a reflective film disposed on a bottom reflection surface of the light guiding plate,
- wherein a row of first low-reflection dots is disposed along a side of a surface of the reflective film, and
- regions of the surface of the reflective film corresponding to the row of the first low-reflection dots have smaller reflectivity with respect to incident light from a LED light strip disposed along the row of the first low-reflection dots than other regions of the surface of the reflective film with respect to the incident light from the LED light strip,
- wherein the first low-reflection dots are formed as protrusions or as a coating of low-reflectivity material on the surface of the reflective film, and the low-reflectivity material has a smaller reflectivity with respect to the incident light from the LED light strip than other regions of the surface of the reflective film with respect to the incident light from the LED light strip, and
- wherein the first low-reflection dots formed as protrusions have a same number as LEDs in the LED light strip, and each of the first low-reflection dots is disposed directly in front of a corresponding LED.

7. A display apparatus comprising a backlight module, the backlight module comprising a light guiding plate, an LED light strip disposed at a light incident side of the light guiding plate, and a reflective film disposed on a bottom reflection surface of the light guiding plate,
- wherein a row of a first low-reflection dots is disposed along a side of a surface of the reflective film, and
- regions of the surface of the reflective film corresponding to the row of the first low-reflection dots have smaller reflectivity with respect to incident lights from an LED light strip disposed along the row of the first low-reflection dots than other regions of the surface of the reflective film with respect to the incident light from the LED light strip,
- wherein the first low-reflection dots are formed as protrusions or as a coating of low-reflectivity material on the surface of the reflective film, and the low-reflectivity material has a smaller reflectivity with respect to the incident light from the LED light strip than other regions of the surface of the reflective film with respect to the incident light from the LED light strip, and
- wherein the first low-reflection dots formed as protrusions have a same number as LEDs in the LED light strip, and each of the first low-reflection dots is disposed directly in front of a corresponding LED.

8. The backlight module according to claim 6, wherein the row of the first low-reflection dots are disposed in parallel to the LED light strip.

9. The backlight module according to claim 6, wherein the first low-reflection dots have a circular shape, a triangular shape or a polygonal shape.

10. The backlight module according to claim 6, wherein at least one row of second low-reflection dots in parallel to the row of the first low-reflection dots are disposed on the opposite side of the row of the first low-reflection dots with respect to the LED light strip, the second low-reflection dots have smaller reflectivity with respect to the incident light from the LED light strip than other regions of the surface of the reflective film with respect to the incident light from the LED light strip.

11. The backlight module according to claim 10, wherein the second low-reflection dots may have different shapes compared with the first low-reflection dots.

12. The display apparatus according to claim 7, wherein the row of the first low-reflection dots are disposed in parallel to the LED light strip.

* * * * *